Patented Dec. 20, 1938

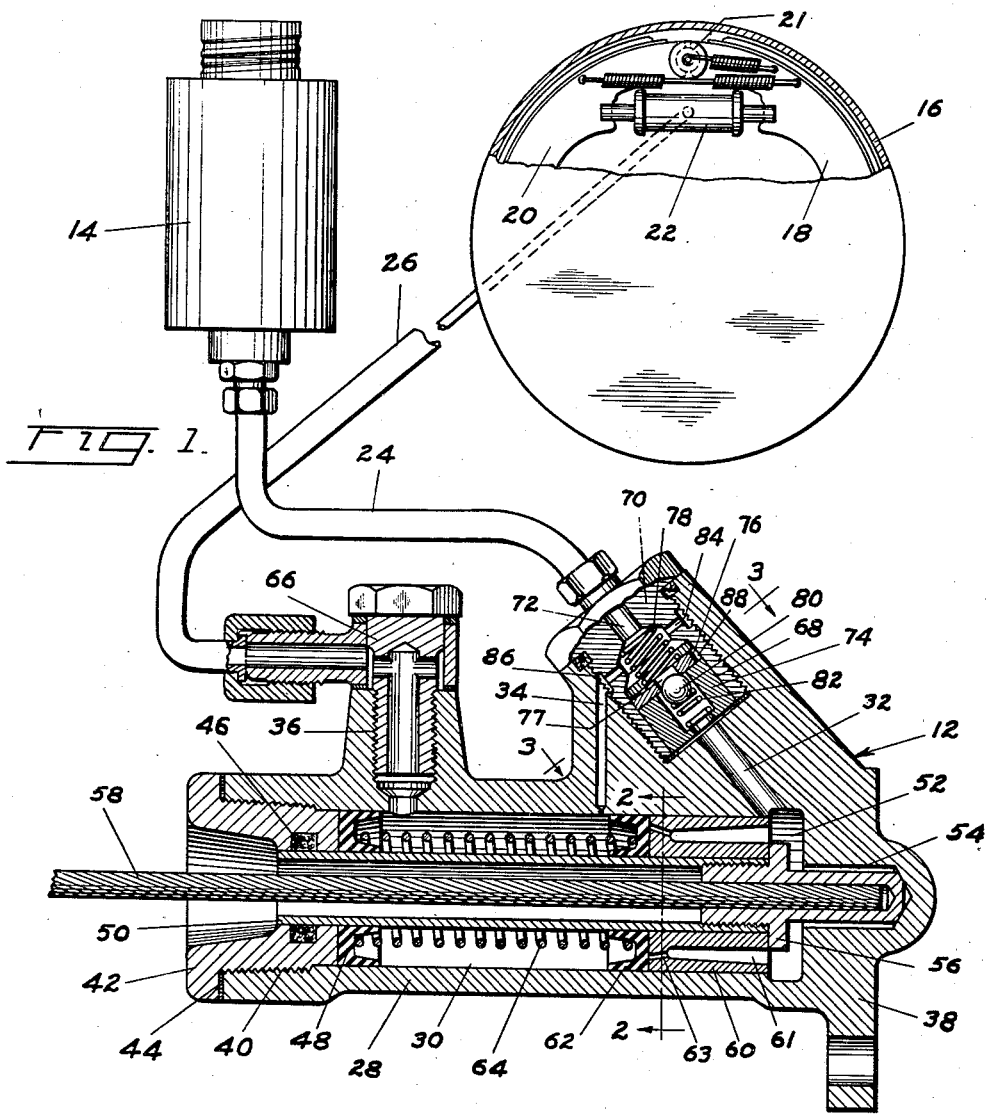
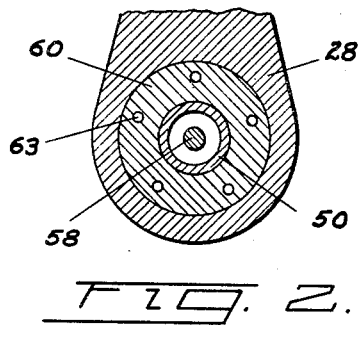

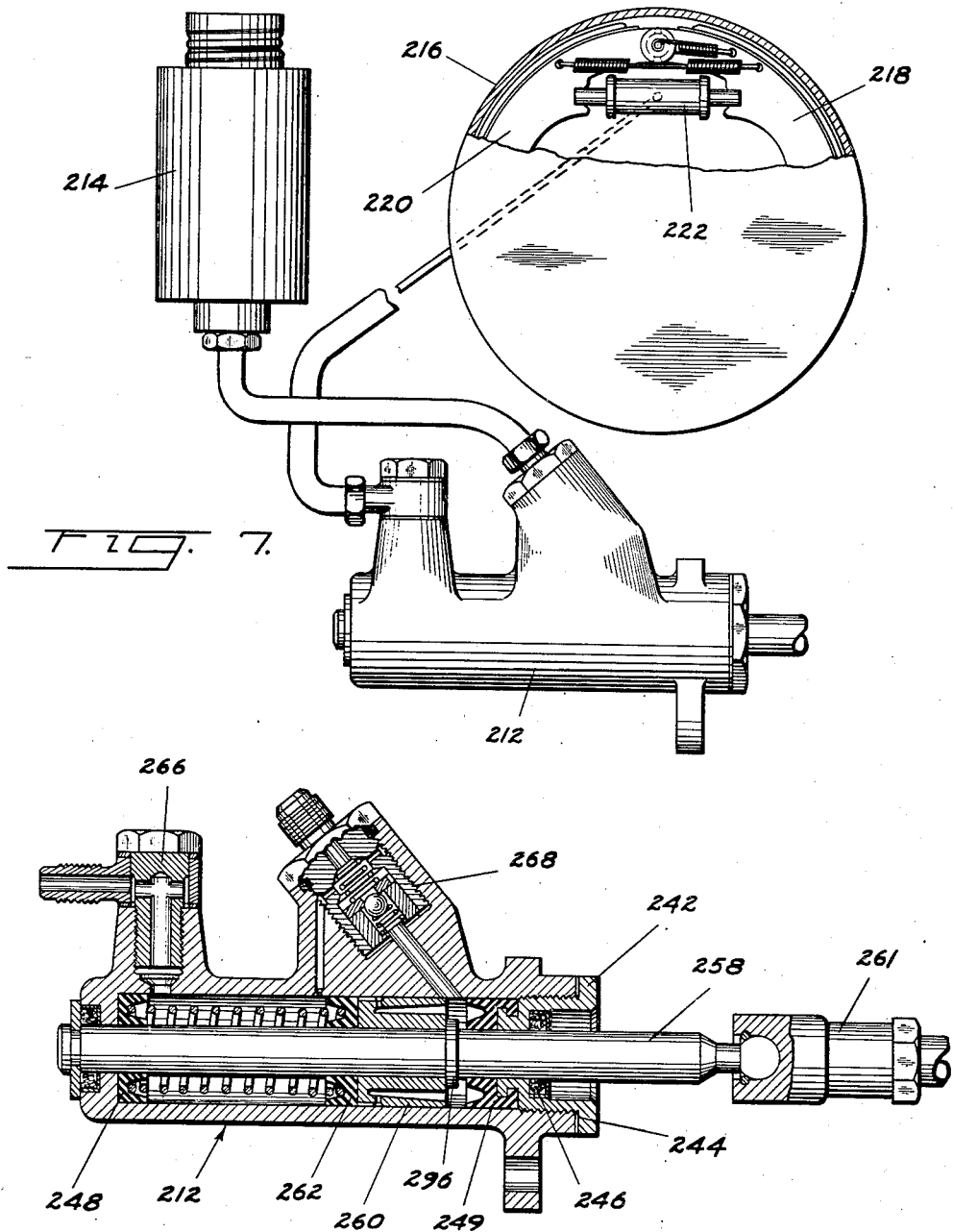

2,140,751

UNITED STATES PATENT OFFICE 2,140,751

HYDRAULIC BRAKE

Ludger E. La Brie and Joseph R. Heidloff, Detroit, Mich., assignors to Bendix Aviation Corporation, South Bend, Ind., a corporation of Delaware Application March 18, 1933, Serial No. 661,613
Renewed May 25, 1938

14 Claims. (Cl. 60—54.6)

This invention relates to brakes and more particularly to hydraulic brake systems.

In hydraulic brake systems as heretofore constructed there is usually provided a master cylinder formed with a compensating chamber rearward of a main pressure producing chamber. These chambers are conventionally separated by a piston and the parts have usually been so arranged that on the rearward stroke the reduction in volume of the compensating chamber is no greater than the increase in volume in the pressure producing chamber. Moreover the arrangement is usually such that a rod or other sliding member must pass through a stuffing box or packing from the compensating chamber to the atmosphere. One danger with such constructions is that of air leaking through the packing and eventually being transmitted to the pressure producing chamber. In such constructions, too, it is usually believed necessary to provide a pressure controlling valve in the outlet between the master cylinder and the conduits leading to the brake cylinders in order to prevent sucking air in at the wheel cylinders and to give ease in bleeding the system of air.

One of the objects of this invention is the elimination of the necessity for the check valve at the front of the master cylinder.

A further object of the invention is the provision of means operated by the retraction of the master cylinder piston for creating positive pressure and causing the automatic filling of the system.

One of the features of the invention is that the cross sectional area in front of the piston is smaller than the cross sectional area back of the piston.

A further feature is the provision of a check valve between the master cylinder and the reservoir.

Further features of the invention relate to the specific construction of the master cylinder piston, the specific construction of the check valve, and the specific construction of the cylindrical member connecting the master cylinder piston with the pedal.

Further objects and features of the invention will be apparent after a reading of the subjoined specification and claims and after a consideration of the accompanying drawings, in which:

Figure 1 is a diagrammatic view showing a brake system constructed according to our invention and having a master cylinder thereof shown on an enlarged scale and in section;

Figure 2 is a sectional view taken substantially on the line 2—2 of Figure 1;

Figure 3 is a sectional view taken substantially on the line 3—3 of Figure 1;

Figure 7 is a diagrammatic view of a modified form of braking system; and

Figure 8 is a view in section of the master cylinder of Figure 7.

Figure 4:
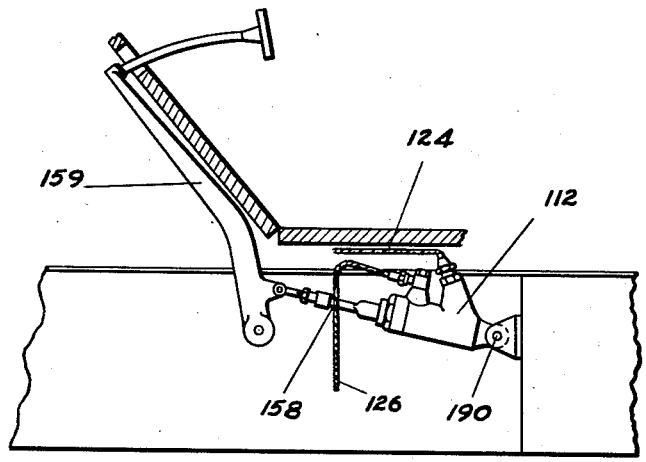
Figure 4 is a view in elevation with parts in section showing a modified form of master cylinder and pedal hookup.

Referring particularly to Figures 1, 2 and 3 of the drawings, there is disclosed a brake system including a master cylinder 12, a supply reservoir 14, a brake drum 16, brake shoes 18 and 20 and a fluid motor or wheel cylinder 22. The master cylinder is connected with the reservoir 14 through a conduit 24 and with the wheel cylinder 22 through a conduit 26.

The master cylinder 12 comprises a main casting 28 formed with a main bore 30 and with intersecting bores 32, 34 and 36. The bore 30 extends through the forward end of the casting 28 but does not extend through the rearward end 38 thereof. The forward end of the bore is threaded internally as at 40 and is provided with an annular plug 42 which normally serves to seal the forward end of the cylinder. The plug 42 has associated therewith packings 44, 46 and 48 which aid in sealing the front end of the cylinder. Sliding through the opening in the plug 42 and contacting with the packings 46 and 48 is a tubular piston connection 50 which serves to transmit force from the pedal to the piston.

The rear end 38 of the casting 28 has the bore 30 slightly enlarged as at 52 and rearwardly thereof the bore is reduced in size as at 54. A plug 56 threaded to the rear end of the tubular member 50 has secured thereto a flexible cable 58 which extends forwardly through the tubular member and is connected to the pedal. Surrounding the tubular member 58 and contacting with the plug 56 on its forward side is the master piston 60 which has associated therewith an annular cup packing 62. A spring 64 interposed between the packings 48 and 62 serves to maintain them in contact with the plug 42 and the piston 60 respectfully and also serves to return the piston 60 to its normal position, as shown.

Force applied to the pedal acts through the cable 58 and the plug 56 to force the piston 60 forward and thus to force liquid from the master cylinder to the brakes. Thus adjacent the front end of the casting, the fitting 66 is threaded into the bore 36 and has threaded on its outer end the conduit 26.

Liquid is supplied to the master cylinder from the reservoir 14 through the conduit 24. It is desirable that there shall be a free interchange of liquid between the reservoir and the master cylinder when the master cylinder piston is in its normal position (as shown) and that substantially free passage of liquid may be allowed from the reservoir to the master cylinder at all times, but it is also desirable that relatively high pressures shall be maintained upon the liquid during operation of the brake without allowing any portion thereof to return to the reservoir during operation of the brake. Moreover, it is desirable that relatively high pressures should be developed upon the liquid rearwardly of the piston while the brake is being released and while the piston is moving rearwardly. Therefore, we have provided a double acting check valve 68 which is positioned to control the flow of liquid through the bore 32 and which is by-passed by the bore 34. The valve 68 comprises a plug 70 connected at its outer end to the conduit 24 and threaded into an enlarged portion of the bore 32. The plug is formed with a central concentric stepped bore 72 and is provided with a sleeve 74 positioned therein adjacent the inner end. A washer 76 is urged by a spring 78 to contact with the outer end of the sleeve 74. A ball check 80 is urged by a relatively weak spring 82 to contact with the washer 76. A transverse bore or bores 84 intersect the bore 72 and connects with an annular groove 86 which registers with the bore 34.

The piston 60 is formed with an annular groove 61 and is provided with a series of ports such as 63 leading from the groove 61 to the rear face of the packing cup 62.

The washer 76 in addition to its central opening 77 is provided with a plurality of small openings 88 through which liquid may pass outward from the master cylinder when the washer 76 is lifted from its seat by pressure exceeding the strength of the spring 78.

Pressure exerted upon the pedal operates through the cable 58 to move the piston 60 forward. This forces the liquid in the master cylinder in front of the piston 60 through the fitting 66 and the conduit 26 to the wheel cylinder 22 to spread the shoes 18 and 20 to contact with the drum 16 and thus causes the shoes to anchor upon the anchor 21. When the pedal is released the spring 64 moves the piston 60 rearwardly until the pressure reaches the value of the spring 78. Should there be a tendency to develop a vacuum in the master cylinder in advance of the piston 60, the liquid rearwardly of the piston will be forced by the pressure through the ports 63 past the annular packing cup 62 to eliminate the vacuum. As soon as the piston 60 has reached the inactive position shown (which is determined by the rearward projection of the plug 56 in the reduced bore 54) substantially free interchange of liquid between the reservoir 14 and the front portion of the master cylinder is allowed by reason of the bore 34, the groove 86, the bores 84, the bore 72, and the conduit 24.

Figure 5:
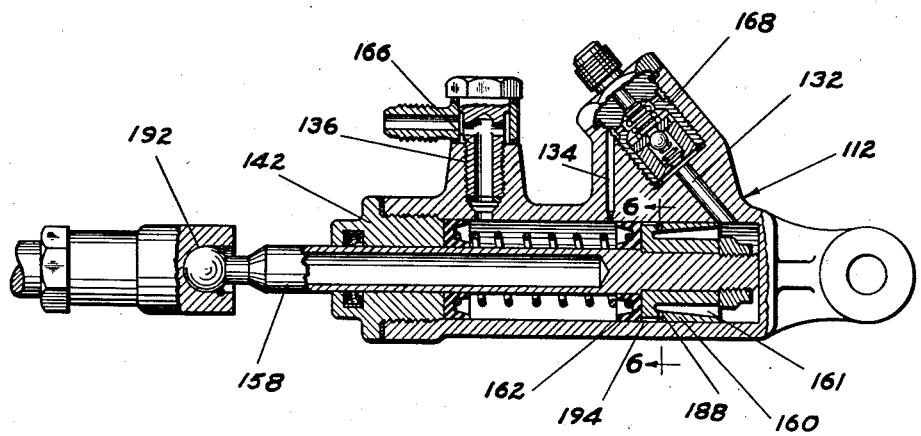
Figure 5 is a sectional view on an enlarged scale of the master cylinder of Figure 4.
Figure 6:
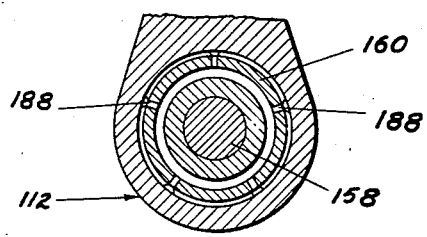
Figure 6 is a sectional view taken substantially on line 6—6 of Figure 5.

The master cylinder 112 shown in Figures 4, 5 and 6 is connected to a reservoir (not shown) by means of a conduit 124 and to wheel cylinders (not shown) by means of a conduit 126. The master cylinder is pivoted at its rearward end as at 190 and is connected to a foot pedal 159 by means of a rigid piston rod 158. The piston rod 158 extends through a plug 142 sealing the forward end of the master cylinder and is connected at its rearward end to a piston 160. The piston rod 158 at its forward end is connected to the pedal 159 by means of a universal joint 192.

The piston 160 is provided with an annular groove 161 and with a series of radial ports such as 188 extending inwardly to said groove. It is also provided with a series of external grooves 194 which lead forwardly from the ports 188 to the packing cup 162.

The master cylinder is provided with an outlet bore 136 in which there is positioned a fitting 166 connected with the conduit 126. It is also provided with inlet bores 132 and 134 associated with a two-way check valve 168.

The operation of this modified form of our invention is substantially similar to the operation of the form previously described. Due to the fact that the master cylinder is itself pivoted, it is unnecessary that the connection with the pedal should be entirely flexible. However, this construction requires that the connections with the reservoir and the wheel cylinder shall be flexible.

In the form shown in Figures 7 and 8 a reservoir 214 supplies liquid to a master cylinder 212 from which the liquid may be forced to a wheel cylinder 222 to apply shoes 218 and 220 to a brake drum 216.

The master cylinder has the rear end open and is provided with a plug 242 therefor. The piston rod 258 extends rearwardly from the master cylinder to a fitting 261 associated with the foot pedal. The forward end of the master cylinder is also formed with an opening which is, however, much smaller than the opening formed in the master cylinder 12 and substantially corresponds to the diameter of the piston rod 258. The piston rod 258 thus extends completely through the master cylinder 212, the passage being sealed at the forward end by a cup 248 and at the rearward end by a cup 249. Associated with the plug 242 are additional packings 244 and 246. The piston 260 is formed similar to the piston 160 and has associated therewith a packing cup 262. A shoulder 296 formed on the piston rod 258 normally contacts with the piston 260 and serves to transmit force exerted upon the pedal through the piston rod 258 to the piston. The master cylinder is provided with an outlet fitting 266 and with a two-way check valve 268 which are substantially similar to corresponding elements in master cylinders 12 and 112.

The operation of this embodiment of our invention is also similar to the operation of the preceding forms described. No flexible connections are required either from the pedal to the piston or from the master cylinder to the reservoir and wheel cylinders. However, the forms disclosed in Figures 1 and 4 are preferable for the reason that only one end of the master cylinder has openings leading to the atmosphere which have to be sealed by packings, etc.

A portion of the subject-matter disclosed herein is also disclosed and claimed in a sole divisional application Serial No. 175,785 filed by Ludger E. La Brie on November 22, 1937.

It is to be understood that the above described embodiments of our invention are for the purpose of illustration only and various changes may be made therein without departing from the spirit and scope of the invention.

We claim:

1. In a hydraulic brake system, a cylinder having a forward end and a rearward end, the latter forming a rearward cylinder head, having an outlet opening positioned adjacent to said forward end, and having an inlet passage positioned adjacent to but forward of said rearward cylinder head, and formed with a separate passage leading from said inlet passage to the interior of said cylinder forward of said inlet passage but also adjacent to said rearward end, a reservoir connected to said inlet passage, a valve device associated with said inlet passage including two oppositely opening spring pressed check valves arranged so as to permit unrestricted flow through said inlet passage from the reservoir to the cylinder and restricted flow from the cylinder to the reservoir and comprising means for preventing the return of liquid through said inlet passage to said reservoir except when the liquid is under a pressure in excess of a predetermined amount while allowing substantially free passage of liquid from said reservoir through said inlet passage and substantially free passage of liquid in both directions to and from said reservoir through said separate passage, and a piston in said master cylinder normally positioned forward of said inlet passage and between said inlet passage and said separate passage so as to form a variable volume chamber between said cylinder head and said piston upon movement of the piston, the piston being arranged to be moved forward over said separate passage toward said outlet opening.

2. In a hydraulic brake system a cylinder having a forward end and a rearward end, the latter forming a rearward cylinder head, having an outlet opening positioned adjacent to said forward end, having an inlet passage positioned forward of said rearward end, and having a separate passage leading from said inlet passage to the interior of said cylinder adjacent to said rearward end but forward of said inlet passage, a reservoir connected to said inlet passage, a valve device associated with said inlet passage including two oppositely opening spring pressed check valves arranged so as to permit unrestricted flow through said inlet passage from the reservoir to the cylinder and restricted flow from the cylinder to the reservoir, and comprising means for preventing the return of liquid through said inlet passage to said reservoir except when the liquid is under a pressure in excess of a predetermined amount while allowing substantially free passage of liquid from said reservoir through said inlet passage and substantially free passage of liquid to and from said reservoir through said separate passage, a piston in said master cylinder normally positioned between said inlet passage and said separate passage and positioned ahead of said inlet passage so as to form with said cylinder head a variable volume chamber upon movement of the piston to which said inlet passage is connected, a packing cup associated with said piston and allowing only forward passage of liquid, and means for advancing said piston forward over said separate passage toward said outlet opening.

3. In a fluid brake apparatus a master cylinder having a rearward end and a forward end adapted to be connected to brakes, a piston provided with means for preventing rearward passage of liquid, but allowing forward passage of liquid past said piston in said master cylinder so as to form with said rearward end a variable volume chamber upon movement of the piston, a cylindrical member slidably mounted in said cylinder to extend through the forward end thereof and connected at its rearward end with said piston, said master cylinder having an inlet at the rearward end thereof between said rearward end and said piston so as to be connected to said variable volume chamber, a reservoir connected to said inlet, and a valve device including two oppositely opening spring pressed check valves arranged so as to permit unrestricted flow through said inlet from the reservoir to the cylinder and restricted flow from the cylinder to the reservoir for controlling said inlet.

4. In a fluid brake apparatus a master cylinder having a forward end adapted to be connected to brakes, a piston in said master cylinder, a cylindrical member slidably mounted in said cylinder to extend through the forward end thereof and connected at its rearward end with said piston, said cylindrical member being hollow, and a flexible tension member secured to the rear end of the cylindrical member and extending forwardly through the hollow thereof forwardly of said cylindrical member.

5. In a hydraulic system for operating brakes, a cylinder having a forward end and a rearward end forming respectively a forward head and a rearward head and formed with an outlet opening adjacent to said forward end adapted to be connected to said brakes, with an inlet opening, and with a separate passage leading from said inlet opening to the interior of said cylinder adjacent to said rearward end but spaced forward of the rearward head and of the inlet opening a reservoir connected to said inlet opening, a valve device including two oppositely opening spring pressed check valves associated with said inlet opening arranged so as to permit unrestricted flow through said inlet opening from the reservoir to the cylinder and restricted flow from the cylinder to the reservoir and including means for preventing the return of liquid from inlet opening to said reservoir except when the liquid is under pressure in excess of a predetermined amount while allowing substantially free passage of liquid from said reservoir to said inlet opening and substantially free passage of liquid between said reservoir and said passage, an annular piston in said master cylinder normally positioned between said inlet opening and said passage and forming with said rearward head upon movement of the piston a variable volume chamber to which said inlet opening is connected but arranged to be moved forward over said passage toward said outlet opening, and a cylindrical member slidably mounted in said cylinder to extend through the forward end thereof and at its rearward end extended through and secured to said piston.

6. In a hydraulic system for operating brakes, a cylinder having a forward end and a rearward end forming respectively a forward head and a rearward head and formed with an outlet opening adjacent to said forward end adapted to be connected to said brakes, with an inlet opening connected to said cylinder forward of said rearward head, and with a passage leading from said inlet opening to the interior of said cylinder adjacent to said rearward end spaced forward of said inlet opening, a reservoir connected to said inlet opening, a valve device including two oppositely opening spring pressed check valves associated with said inlet opening arranged so as to permit unrestricted flow through said inlet opening from the reservoir to the cylinder and restricted flow from the cylinder to the reservoir and including means for preventing the return of liquid from the inlet opening to said reservoir except when the liquid is under pressure in excess of a predetermined amount while allowing substantially free passage of liquid from said reservoir to said inlet opening and substantially free passage of liquid between said reservoir and said passage, an annular piston in said master cylinder positioned ahead of said inlet opening so as to form with said rear head a variable volume chamber upon movement of the piston to which chamber said inlet opening is connected and normally positioned between said inlet opening and said passage but arranged to be moved forward over said passage toward said outlet opening, a cylindrical member slidably mounted in said cylinder to extend through the forward end thereof and at its rearward end extended through and secured to said piston, a packing cup associated with said piston and allowing only forward passage of liquid, and an annular packing cup surrounding said cylindrical member, facing rearward of said master cylinder and positioned at the forward end of said master cylinder.

7. In hydraulic pressure apparatus, a compression cylinder, a piston reciprocable in said cylinder, a cylindrical portion extending forward from said piston, a closure at the rear end of said cylinder forming a chamber in rear of the piston, a closure at the front end of said cylinder through which said cylindrical portion projects forming a chamber in front of said piston of smaller displacement than the chamber in the rear, means permitting fluid flow past said piston from rear to front only, a fluid reservoir, a single connection between the fluid reservoir and the chamber in rear of the piston, a second connection between the reservoir and the chamber in front of the piston, and means including said piston and a valve in said first-mentioned connection for creating pressure in the chamber in rear of the piston on the return stroke of said piston and for forcing fluid from said chamber past said cylinder and into the chamber in front of the cylinder.

8. In hydraulic pressure apparatus, a compression cylinder, a piston reciprocable in said cylinder constructed and arranged to displace more fluid on its rearward stroke than on a forward stroke of equal length, closures at the front and rear of the piston forming variable volume chambers with the piston, means permitting fluid flow past said piston from rear to front only, a fluid reservoir, a single connection between the fluid reservoir and the chamber in rear of the piston, a second connection between the reservoir and the chamber in front of the piston, and means including said piston and a valve in said first mentioned connection for creating pressure in said fluid seal during the return stroke of said piston and for forcing fluid from said seal past said piston and into the chamber in front of the piston.

9. In a liquid pressure mechanism, a cylinder, a piston reciprocable therein, means forming a pressure chamber in front of the piston, means forming a liquid containing chamber at the rear of the piston the volume of which varies with the piston movement, the piston and cylinder being so constructed and arranged that the displacement by the piston in the pressure chamber is less than the displacement by the piston in the liquid containing chamber, said piston being provided with means preventing liquid from passing the piston on its forward stroke but permitting such passage on the return stroke, a reservoir, valve means for admitting liquid to the liquid containing chamber from the reservoir on the forward stroke of the piston, and valve means permitting liquid to flow from the chamber to the reservoir when the piston during its return stroke applies a predetermined pressure to the liquid in the chamber.

10. In a liquid pressure mechanism, a cylinder, a piston reciprocable therein, a cylindrical projection on the front of the piston extending through a sealed opening in the front of the cylinder, means forming a liquid containing chamber at the rear of the piston, the volume of which varies with the piston movement, said piston being provided with means preventing liquid from passing the piston on its forward stroke but permitting such passage on the return stroke, a reservoir, valve means for admitting liquid to the chamber from the reservoir on the forward stroke of the piston, and valve means permitting liquid to flow from the chamber to the reservoir when the piston during its return stroke applies a predetermined pressure to the liquid in the chamber.

11. In a fluid pressure mechanism, a cylinder, a piston reciprocable therein dividing the cylinder into a pressure chamber and a fluid chamber, said cylinder and piston being constructed and arranged so that the piston displaces more fluid in the fluid chamber on a return stroke than it displaces in the pressure chamber on a forward stroke, a reservoir, means forming a passage between the reservoir and the cylinder, said passage being uncovered by the piston in its retracted position, means forming a passage between the reservoir and the fluid chamber, means permitting fluid to flow from said chamber past the piston on its return stroke, and valve means for said passages for allowing fluid to flow therethrough in one direction when the fluid pressure in that direction is a given value and in the other direction when the pressure in said direction is at a lower value.

12. In a fluid pressure mechanism, a cylinder, a piston reciprocable therein dividing the cylinder into a pressure chamber and a fluid chamber, said piston having a cylindrical projection on its forward end projecting through a sealed opening in the forward end of the cylinder, a reservoir, means forming a passage between the reservoir and the cylinder, said passage being uncovered by the piston in its retracted position, means forming a passage between the reservoir and the fluid chamber, means permitting fluid to flow from said chamber past the piston on its return stroke, and valve means for said passages for allowing fluid to flow therethrough in one direction when the fluid pressure in that direction is a given value and in the other direction when the pressure in said direction is at a lower value.

13. In a fluid pressure mechanism, a cylinder, a piston reciprocable therein, a reservoir, means forming a passage between the reservoir and the cylinder, said passage being uncovered by the piston in its retracted position, a fluid containing chamber at the rear of the piston the volume of which varies with the piston movement, means forming a passage between the reservoir and the chamber, means permitting fluid to flow from said chamber past the piston on its return stroke, and valve means for said passages for allowing fluid to flow from said reservoir therethrough at a predetermined pressure and in the opposite direction when the pressure in said direction is of greater value, said piston and cylinder being constructed and arranged to displace more fluid on a return stroke than on a forward stroke.

14. In a fluid pressure mechanism, a cylinder, a piston reciprocable therein, a reservoir, means forming a passage between the reservoir and the cylinder, said passage being uncovered by the piston in its retracted position, a fluid containing chamber at the rear of the piston the volume of which varies with the piston movement, means forming a passage between the reservoir and the chamber, means permitting fluid to flow from said chamber past the piston on its return stroke, and valve means for said passages for allowing fluid to flow from said reservoir therethrough at a predetermined pressure and in the opposite direction when the pressure in said direction is of greater value, said piston having a cylindrical projection on its forward end projecting through a sealed opening in the forward end of the cylinder.

LUDGER E. LA BRIE.
JOSEPH R. HEIDLOFF.